June 22, 1965  W. S. GUBELMANN  3,190,402
SPEED RESPONSIVE GOVERNOR FOR CALCULATING
MACHINES AND THE LIKE
Original Filed Nov. 6, 1950

INVENTOR
William S. Gubelmann, deceased
by Walter S. Gubelmann, executor
BY Burgess, Ryan & Hicks
  John F. Ryan
  ATTORNEYS

3,190,402
SPEED RESPONSIVE GOVERNOR FOR CALCULATING MACHINES AND THE LIKE
William S. Gubelmann, deceased, late of Convent, N.J., by Walter S. Gubelmann, executor, Oyster Bay, N.Y., assignor to Realty & Industrial Corporation, Morristown, N.J., a corporation of Delaware
Application Oct. 7, 1960, Ser. No. 61,322, now Patent No. 3,098,609, dated July 23, 1963, which is a division of Ser. No. 194,273, Nov. 6, 1950, now Patent No. 2,969,177, dated Jan. 24, 1961. Divided and this application Nov. 21, 1962, Ser. No. 239,381
7 Claims. (Cl. 188—185)

This invention relates to improvements in speed responsive governors and the like.

This invention also relates to speed responsive governors for individual mechanisms of calculating machines and the like wherein several distinct ones of such mechanisms may be required to operate at different rotative speeds though such mechanisms are operated differentially by the same power source.

Furthermore, the invention relates to speed responsive governors for distinct mechanisms operable by differential drive means which are driven by generally constant rotative drive forces, otherwise uncontrolled as to speed, such as the drive forces derived from a constantly tensioned spring motor.

An object of the invention is to provide improved governors for several discrete mechanisms operable independently under the power of a constantly tensioned spring motor furnishing a common source of power to said mechanisms.

Another object of the invention is to provide an improved governor having speed responsive V-shaped brake shoes and an improved stationary brake drum having an internal braking surface which is conformingly V-shaped in cross-section and providing guidance for the shoes, as well as improved braking effect.

Another object of the invention is to provide an improved speed responsive governor that is equally effective in both rotative directions and incorporating self-energizing and non-self-energizing brake means.

Still another object of the invention is to provide an improved speed responsive governor having self aligning brake shoe means for smooth and uniform braking action.

Still a further object of the invention is to provide an improved speed responsive governor which is simple in design, inexpensive to manufacture, and is made of few parts, so that it is rugged and less likely to require servicing.

The foregoing and other objects and advantages of the invention will be more readily understood upon reference to the following disclosure. It will be apparent, however, that those skilled in the art will be enabled to apply the teachings of this disclosure to various modifications as intended to be covered by the scope of the appended claims. The specification is directed to an exemplary embodiment of the invention as illustrated in the accompanying drawings wherein:

This application is a division of copending application, Serial No. 61,322, filed October 7, 1960 and now issued July 23, 1963 as Patent No. 3,098,609 for Calculating Machine Driving Mechanism and the Like, which in turn is a division of patent application, Serial No. 194,273, filed November 6, 1950 and issued January 24, 1961, as Patent No. 2,969,177 for Partial Product Calculating Machine.

The machine in which the present invention is embodied is disclosed in detail in the afore-mentioned copending application, Serial No. 61,322 and now Patent No. 3,098,609, of which this application is a division, and in the aforementioned now issued parent Patent No. 2,969,177, to which reference may be had for a complete disclosure not otherwise set forth in detail herein. A brief summary of the machine and its operations, however, is presented herewith in order to facilitate understanding of the invention and its interaction with various mechanisms of the machine.

The calculating machine, fully disclosed in the above mentioned parent Patents 3,098,609 and 2,969,177 and in which the use of the present invention is also employed, embodies predetermined partial product and quotient representations in a multiplying and a dividing mechanism respectively; a shiftable register carriage and a carriage shifting mechanism; several banks of keys for setting up factors in various computations; a bank of multiplier keys, each of which serves to initiate a multiplying cycle of operations; an addition initiating key, a subtraction initiating key, division initiating keys, and carriage shifting keys. The machine also includes an automatically powered spring motor, and also has three main actuating units constantly urged rotatively by the main operating mechanism for actuating the multiplying, dividing and shifting mechanisms. Hereinafter, for convenience, each main actuating unit is referred to respectively as the multiplying, dividing or carriage power or drive unit as the case may be.

Figure 1:
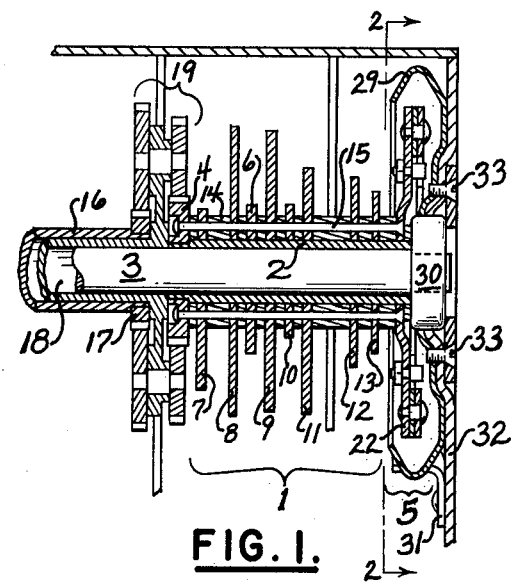
FIGURE 1 is a fragmentary sectioned view of one end of the drive shaft, and including one power unit, one of the two differentials for connecting the drive units with the shaft, and a governor for the illustrated one of the drive units.

Multiplying drive unit 1, FIGURE 1, is formed of a sleeve 2 rotatably mounted on shaft 3, journaled on the machine frame, a drive gear 4 and a speed responsive governor unit 5 secured respectively to the left and right ends of the sleeve, and cams 6, 7, 8, 9, 10, 11, 12 and 13 mounted on the sleeve between the gear and governor with suitable annular spacers 14 therebetween. Components of governor 5, drive gear 4 and the interposed cams and spacers are secured together as a unit by longitudinal rod means 15 for movement together.

The unit is constantly urged to rotate by means of its gear 4, as disclosed in the above mentioned parent patents. Rotation of the unit is counterclockwise, as when viewing its governor from the left as in FIG. 2 and indicated by the arrow thereon. In a 360-degree revolution, the several cams of the multiplying power unit operate the multiplying mechanisms, and the rate of such rotation is controlled by the governor, which will be described in further detail below. Stop cam 6 (FIG. 1) cooperating with a stop-start mechanism, described in detail in the afore-mentioned parent patents, serves to hold the multiplying power unit in its stop-start position. Normally the multiplying power unit is allowed to operate through only one revolution at a time, but under certain circumstances it is allowed to rotate continually for several revolutions before being stopped, as explained in detail in the afore-mentioned parent patent and copending application.

The carriage power unit, not shown in detail herein, comprises various cams and a change direction mechanism for performing carriage shifting operations such as automatically initiating sequential computing operations of the machine as well as shifting the carriage automatically during computing operations or shifting the carriage in either direction under manually operable key controls as disclosed in detail in the aforementioned parent patents. The carriage power unit also comprises stop-start control means, now shown here, for controlling the carriage power unit and the rotation of its power input sleeve 16 (FIG. 1) and drive gear 17 secured thereto.

Sleeve 16 is rotatably mounted on the main longitudinal journaled power shaft 3. The power shaft 3 is constantly urged to rotate and through interconnected differential means, not shown herein, the sleeve 18 is constantly urged to rotate, as disclosed in detail in the previously mentioned parent patents.

A differential 19, secured to sleeve 18 for operation therewith, connects the sleeve 18 with the gear 4 of the multiplying power unit 1 and with the gear 17 on the sleeve 16 of the carriage shifting power unit for exerting yieldable unidirectional rotative power on both power units as explained in detail in the parent patents.

Figure 4:
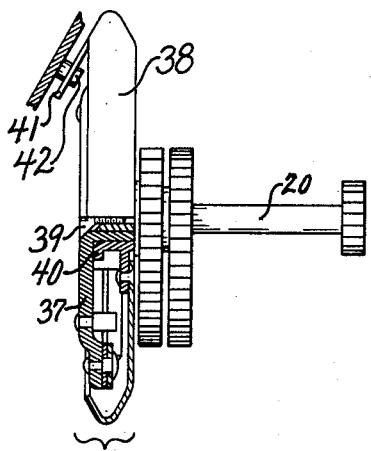
FIGURE 4 is a fragmentary view of some of the parts of the carriage shifting mechanism, showing principally a one quarter sectional elevational view of the carriage shifting mechanism governor.

As mentioned above, the sleeve 16 of the carriage power unit is constantly urged to rotate, but such operation is normally releasably blocked by its stop-start means as described in further detail in the afore-mentioned parent patents. In respect to the instant invention, it is sufficient only to know that, for each unidirectional revolution of sleeve 16, shaft 20 (FIG. 4) of the carriage shifting power unit is rotated one revolution in one direction or another, depending on adjustment of the carriage direction control means, for each ordinal step of the carriage in a corresponding direction and these parts may be operated a number of successive continuous revolutions for shifting the carriage as many uninterrupted ordinal steps, as explained in the parent patents.

The shaft 20 is rotatably mounted in a carriage shifting mechanism frame, not shown herein, and it is rotated one direction or another, one or more revolutions, for shifting the register carriage in a corresponding direction and extent. Since the machine is powered by yieldable motive forces sufficient to cause rapid single step carriage shifting as required at times, it can be understood that uninterrupted shifting would result in acceleration beyond desirable speeds. Therefore, a governor 21 (FIG. 4) is coupled with the shaft 20 for controlling the speed of the shaft and preventing operation of the carriage shifting mechanism above a predetermined speed. The specific structure of the governor 21 will be described fully hereinafter.

The governing means 5 (FIG. 1) for the multiplying power unit 1 will now be described.

Figure 2:
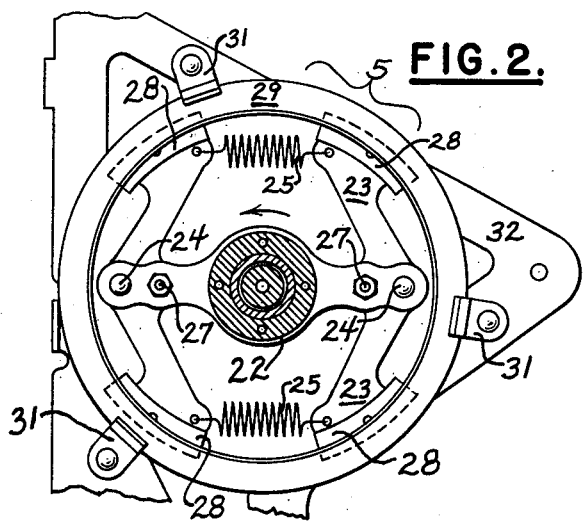
FIGURE 2 is a left sectional elevational view of the governor taken on plane 2—2 in FIGURE 1.
Figure 3:
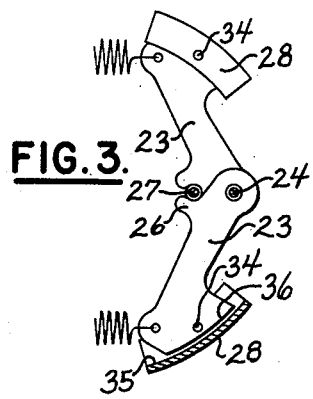
FIGURE 3 is a fragmentary elevational view of some of the parts shown in FIGURE 2 and showing primarily two shoe carrier arms, their mounting pivot and return stop, and showing two of the speed governing brake shoes, one of which shoes is shown in cross-section.

Lever 22 is secured intermediate its ends to the unit 1 by the rods 15 for rotation with the unit. Referring to FIGS. 2 and 3, a pair of carriers 23 is pivoted at 24 at each end of lever 22 (FIG. 2). A spring 25 is fastened to each carrier of a pair and to the corresponding carrier of the other pair for turning the respective carriers inwardly toward the axis of lever 22. The inward movement of each carrier is limited by integral finger 26 (FIG. 3) contacting a stud 27 on each arm of lever 22 (FIG. 2). A V-shaped brake-shoe mass 28 is mounted on the free end of each carrier, and a stationary circular brake-casing or drum 29, the internal periphery of which conforms to the shape of the brake-shoes, envelops the shoes. The casing 29 is supported by the main shaft journal 30 (FIG. 1), which is fixed to the machine frame. The casing 29 is held to the machine frame by suitable spring clamps 31 (FIG. 2) which are fixed to machine frame plate 32. Studs 33 (FIG. 1) on plate 32 extend through suitable holes in casing 29 to block turning of the casing.

Each brake-shoe 28 (FIG. 3) is secured to its respective carrier by a single pivot pin 34, which permits angulation of the shoe in respect to its carrier as the shoe contacts the curvilinear internal surface of the casing for allowing each shoe to seek its own perfect fit thereagainst. The brake shoe is slotted annularly in respect to the rotation for receiving the carrier, bottom surface 35 of the slot being a slightly greater distance from the pin 34 than matching surface 36 of the carrier for allowing slight pivoting and limiting the angulation of the shoe in respect to the carrier to approximately the proper angle of the shoe. In this manner, the shoes are mounted to align themselves properly with the casing upon contact of the shoes therewith.

In the normal position of the parts, as shown in FIG. 2, the shoes 28 are not in contact with the internal clutching surface of the casing 29, but, when the speed of rotation of lever 22 reaches a certain predetermined magnitude, the shoe-masses respond to centrifugal forces sufficiently to overcome the restraint of springs 25, swing outwardly about the respective pivots of the carriers and press against the casing 29 to prevent the multiplying power unit from rotating faster than a predetermined maximum speed.

The governor 21 (FIG. 4) for the carriage moving mechanism is similar in structure and function to the above described governor 5 for the multiplying power unit. The carriers and brake-shoes of governor 21 are identical to the corresponding parts in governor 5, FIG. 2. The carrier-restraining springs of the two governors may differ only in tension for suitably varying application of the respective brake-shoes against the drums. Lever 37 (FIG. 4) and brake-casing 38 differ from the corresponding lever 22 (FIG. 2) and casing 29 in structural details, only for mounting purposes. The following description will, therefore, refer only to the mountings of these several parts. As described previously, journaled shaft 20 (FIG. 4) of the shifting mechanism rotates one direction or the other while the carriage is being shifted either leftward or rightward, respectively. As viewed in FIGURE 4, the left end of shaft 20 is square in cross-section and the lever 37 has a mating square center hole fitted to the square portion of the shaft for positive turning of the lever with the shaft. The lever is further fixed on the shaft by a screw 39 threaded in a center bored hole in the end of the shaft. The hub portion of lever 37 is formed with an external journal on which a flanged center bearing member 40 is mounted. Brake-casing 38 is secured to the larger flange of bearing 40. Thus the casing 38 is supported by shaft 20 without hindering rotation of the shaft. Turning of the casing is prevented by integral bifurcated extension 41 which embraces stationary stud 42 on the machine frame.

The division power unit is not shown herein, since its construction generally speaking, is similar to that of the multiplying power unit and does not contribute additionally to the disclosure of the instant invention as claimed. In this particular case, it is sufficient to know that the division power unit and the sleeve 18 (FIG. 1) are connected by differential gearing (not shown here) with the power shaft 3 for being driven as required by the shaft 3 and the yieldable rotative drive forces applied thereto, as explained in detail in the parent patents. It may also be interesting to know that the power units may be driven, upon liberation as required, to rotate either individually or concurrently with another of the units, as explained in the parent patents.

Although a detailed description of a preferred embodiment of the invention has been set forth herein, it is understood that various changes may be made in size, shape, materials and arrangement, within the spirit and scope of the invention, and that applicant does not wish to be limited by the description but only by the scope of the appended claims.

What is claimed is:

1. A speed responsive governor for a calculating machine having a continually impelled rotatable drive unit, said governor comprising a stationary brake drum having its inner surface defining a hollow area therein, hub means supported axially for rotation in said hollow area under the influence of said rotatable drive unit, first and second extension arms carried by and extending radially in opposite directions from said hub means for rotation therewith, first and second brake shoe carrier members pivoted at their proximal ends on the outer end of each of said extension arms for rotation therewith and said first and second brake shoe carrier members extending in opposite directions from their respective pivoted end of their related said extension arm, brake shoes carried on each of said brake shoe carrier members for engaging against said inner surface of said brake drum when said brake shoe carrier members are moved into braking positions, first spring means resiliently connecting respectively said first brake shoe carrier member of said first extension arm with said second brake shoe carrier member of said second extension arm for biasing them toward each other and in positions retracted out of braking engagement with said brake drum inner surface, and second spring means resiliently connecting respectively said second brake shoe carrier member of said first extension arm with said first brake shoe carrier member of said second extension arm for biasing them toward each other and in positions retracted out of braking engagement with said brake drum inner surface, said first and second springs being so constructed and tensioned as to hold said brake shoes retracted out of said braking contact at all speeds of rotation of said rotatable drive unit below a predetermined speed of rotation, and so as to be overcome by centrifugal force due to speeds of rotation above said predetermined speed of rotation, so that said brake shoe carriers and their respective brake shoes thereupon engage and brake said rotatable drive unit against exceeding said predetermined speed.

2. The construction according to claim 1, and characterized further in that said brake drum is annular in contour and said inner surface of said brake drum is substantially V-shaped in cross-section, and said brake shoes are V-shaped to correspond with and fit into said V-shaped cross-section of said brake drum inner surface for braking action.

3. A speed responsive speed control governor for a machine in which there is a yieldingly impelled rotatable driving unit, said governor comprising a stationary brake drum with an internal curved braking area, hub means supported axially on said driving unit for rotation therewith concentrically within said braking area, a plurality of extension arms carried by and extending radially from said hub means for rotation therewith, first and second brake-shoe carrier members pivoted at their proximal ends on the outer end of each of said extension arms for rotation therewith, said first and second brake shoe carrier members extending in opposite directions from their respective pivoted supporting end of their related said extension arm, brake shoe means carried on each of said brake-shoe carrier members for engaging against said braking area of said brake drum when said brake-shoe carrier members are moved into braking positions, and spring means connecting each said first brake-shoe carrier member with the adjacent said second brake-shoe carrier member for biasing them toward each other and in positions retracted from said braking area at speeds of rotation below a predetermined magnitude and so as to be overcome and moved by centrifugal force due to speeds of rotation above said predetermined magnitude, each of said brake shoes and their respective said carrier members being constructed for being self energizing brake means when rotated in advance of their respective extension arms and being constructed for being non-self-energizing brake means when rotated in a direction followingly in respect to their respective said extension arms, whereby the effectiveness of braking power is substantially equal when the direction of rotation of said drive unit is in one direction and in the opposite direction.

4. A speed responsive speed control governor for a machine in which there is a yieldable constantly impelled rotatable driving unit, said governor comprising hub means fixed on said driving unit for axial rotation therewith and comprising an external journal concentric with said axial rotation, a plurality of extension arms carried by and extending radially from said hub means for rotation therewith, first and second brake shoe carrier members pivoted at their proximal ends on the outer end of each of said extension arms for rotation therewith, said first and second brake shoe carrier members extending in opposite directions from their respective pivoted end of their related said supporting extension arm, brake shoes responsive to centrifugal forces and carried on each of said brake shoe carrier members, contractile spring means connecting each said first brake-shoe carrier member with the adjacent second brake-shoe carrier member for biasing them and the shoes carried thereby toward each other and toward an ineffective retracted position at speeds of rotation below a certain speed and so as to yield and be overcome by centrifugal force at speeds of rotation above said certain speed, and a brake drum means comprising a center bearing member supported on said journal of said hub means for allowing rotation of said hub means relative to said bearing member and for supporting said drum means concentrically with said hub means, an internal curved braking surface concentric with said bearing member for receiving said brake shoes upon movement of said brake shoes responsive to the effect of centrifugal force, and anchor means for supporting said drum means and blocking rotation thereof.

5. A speed responsive speed control governor for a machine in which there is yieldingly impelled rotatable driving unit, said governor comprising a stationary brake drum formed with a curved internal braking surface area, hub means supported coaxially on said driving unit for rotation therewith concentrically within said braking area, a plurality of extension arms carried by and extending radially from said hub means for rotation therewith, first and second brake-shoe carrier members pivoted at their proximal ends on the outer end of each of said extension arms for rotation therewith, said first and second brake shoe carrier members extending annularly in opposite directions from their respective pivoted end of their related said extension arm, brake shoe means rockably carried on each said brake-shoe carrier members for self aligning contact with said braking area of said brake drum and being responsive to centrifugal forces for braking engagement with said brake drum to retard the speed of rotation of said drive unit whenever said drive unit tends to exceed a predetermined speed of rotation, and spring means connecting each said first brake shoe carrier member with the adjacent said second brake shoe carrier member for biasing them toward each other and into positions retracted from contact with said braking area at speeds of rotation below said predetermined speed so as to be overcome by centrifugal force due to speeds of rotation above said predetermined speed of rotation and so as to allow braking engagement of said brake shoe means.

6. A governor comprising annular drum means formed with first and second mutually convergent side walls defining an annular hollow brake shoe receiving area substantially V-shaped in cross section with the apex of the V-shape radially outermost, bracket means engaging said drum means for supporting the same against movement, hub means extending concentrically within said drum means and connectable to a source of rotary drive power for being rotated thereby, a plurality of brake shoe supporting means carried by said hub means for rotation therewith and pivotally movable thereon centrifugally toward said drum means on rotation of said hub means, resilient means connected to said brake shoe supporting means for normally holding the same in retracted positions, and brake shoe means pivotally carried by outer portions of said brake shoe supporting means for movement therewith, said brake shoe means being formed substantially V-shaped in cross section conformingly to the V-shape of said brake shoe receiving hollow area of said drum, for being brakingly engaged with said drum inner surfaces and automatically matingly centered therein.

7. A speed-responsive governor for a machine having a continually impelled rotatable drive unit, said governor comprising a stationary brake drum, a member internal said drum and connected to said drive unit for rotation therewith, carrier arms pivoted on said member, a shoe mass on each carrier arm responsive to centrifugal forces for clutching said brake drum to retard the speed of rotation of said drive unit whenever said drive unit tends to exceed a predetermined maximum speed and wherein each said shoe mass is pivotally mounted on its respective carrier arm for limited angular movement for permitting self alignment of each said shoe mass with said brake drum upon contact of said shoe mass with said drum, and resilient means engaging said carrier arms for normally holding said shoe masses out of contact with said brake drum.

References Cited by the Examiner

UNITED STATES PATENTS

| | | | |
|---|---|---|---|
| 462,228 | 11/91 | Amet | 188—185 |
| 574,209 | 12/96 | McFadden | 188—185 |
| 1,303,460 | 5/19 | Cain | 188—185 |
| 1,904,089 | 4/33 | Schwerin | 188—185 |
| 2,174,529 | 10/39 | Proctor | 188—184 X |
| 2,244,494 | 6/41 | Mahoney | 188—185 |
| 2,582,755 | 1/52 | Kenny. | |
| 2,896,912 | 7/59 | Faugier et al. | 188—185 X |

EUGENE G. BOTZ, *Primary Examiner.*

DUANE A. REGER, ARTHUR L. LA POINT,
*Examiners.*